(12) United States Patent
Kutsukake et al.

(10) Patent No.: US 9,205,563 B2
(45) Date of Patent: Dec. 8, 2015

(54) WORKPIECE TAKEOUT SYSTEM, ROBOT APPARATUS, AND METHOD FOR PRODUCING A TO-BE-PROCESSED MATERIAL

(71) Applicant: KABUSHIKI KAISHA YASKAWA DENKI, Kitakyushu-shi (JP)

(72) Inventors: Fuminori Kutsukake, Kitakyushu (JP); Toshimitsu Irie, Kitakyushu (JP); Yuya Yasuda, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 295 days.

(21) Appl. No.: 13/644,323

(22) Filed: Oct. 4, 2012

(65) Prior Publication Data

US 2013/0094932 A1    Apr. 18, 2013

(30) Foreign Application Priority Data

Oct. 13, 2011  (JP) ................. 2011-225434

(51) Int. Cl.
*B65G 65/00* (2006.01)
*B25J 9/16* (2006.01)
*G05B 19/418* (2006.01)

(52) U.S. Cl.
CPC ......... *B25J 9/1697* (2013.01); *G05B 19/41815* (2013.01); *G05B 2219/37555* (2013.01);
(Continued)

(58) Field of Classification Search
CPC ...... B25J 9/1612; B25J 9/1687; B25J 9/1697; B25J 15/00; G05B 2219/37555; G05B 2219/37558; G05B 2219/39508; G05B 2219/39517; G05B 2219/40038; G05B 2219/40087; G05B 2219/40564; G05B 2219/40613; G05B 2219/45063
USPC ......... 700/250, 253, 258–259, 264, 112, 114, 700/213, 223, 228–229; 901/9, 40, 44–47, 901/318, 568.16; 414/780–783; 382/153
See application file for complete search history.

(56) References Cited

U.S. PATENT DOCUMENTS 7,123,992 B2 *  10/2006  Ban et al. ................ 700/258
8,825,212 B2 *   9/2014  Irie et al. ................ 700/259
(Continued)

FOREIGN PATENT DOCUMENTS

CN    101291784    10/2008
EP      1418025     5/2004
(Continued)

OTHER PUBLICATIONS

Japanese Office Action for corresponding JP Application No. 2011-225434, Jan. 21, 2014.
(Continued)

*Primary Examiner* — Khoi Tran
*Assistant Examiner* — Robert Nguyen
(74) *Attorney, Agent, or Firm* — Mori & Ward, LLP

(57) ABSTRACT

A workpiece takeout system includes a robot arm and a disposed-state detector. The robot arm is configured to perform a workpiece takeout operation to take out a workpiece disposed in an area among a plurality of areas. The disposed-state detector is configured to detect a disposed state of the workpiece and is configured to, while the robot arm is performing the workpiece takeout operation to take out the workpiece disposed in the area among the plurality of areas, detect a disposed state of another workpiece disposed in another area among the plurality of areas.

20 Claims, 5 Drawing Sheets

First embodiment (Second embodiment)

(52) U.S. Cl.
CPC ............... *G05B2219/39508* (2013.01); *G05B 2219/40053* (2013.01); *G05B 2219/40564* (2013.01); *G05B 2219/40607* (2013.01); *G05B 2219/40609* (2013.01); *G05B 2219/45063* (2013.01)

(56) References Cited

U.S. PATENT DOCUMENTS

| | | | |
|---|---|---|---|
| 2008/0253612 A1* | 10/2008 | Reyier et al. | 382/103 |
| 2011/0098859 A1 | 4/2011 | Irie et al. | |
| 2011/0301744 A1* | 12/2011 | Ichimaru | 700/214 |
| 2012/0323363 A1* | 12/2012 | Izumi et al. | 700/248 |

FOREIGN PATENT DOCUMENTS

| | | |
|---|---|---|
| EP | 1862270 | 12/2007 |
| JP | 01-183395 | 7/1989 |
| JP | 09-239682 | 9/1997 |
| JP | 2004-160567 | 6/2004 |
| JP | 2010-243317 | 10/2010 |
| JP | 2011-115930 | 6/2011 |
| WO | 2007/046763 | 4/2007 |

OTHER PUBLICATIONS

Extended European Search Report for corresponding EP Application No. 12188353.2-1239, Nov. 27, 2012.

Japanese Office Action for corresponding JP Application No. 2011-225434, Aug. 20, 2013.

Chinese Office Action for corresponding CN Application No. 201210385508.9, Jun. 23, 2014.

Chinese Office Action for corresponding CN Application No. 201210385508.9, Feb. 3, 2015.

* cited by examiner

First embodiment (Second embodiment)

First embodiment (Second embodiment)

FIG. 3  First embodiment (Second embodiment)
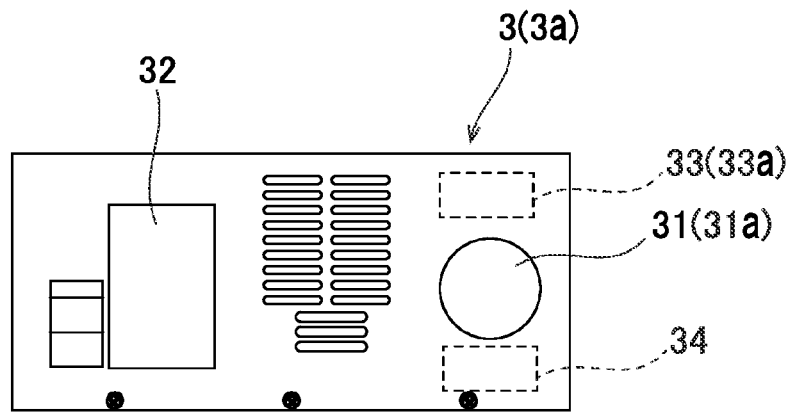
FIG. 4  First embodiment (Second embodiment)
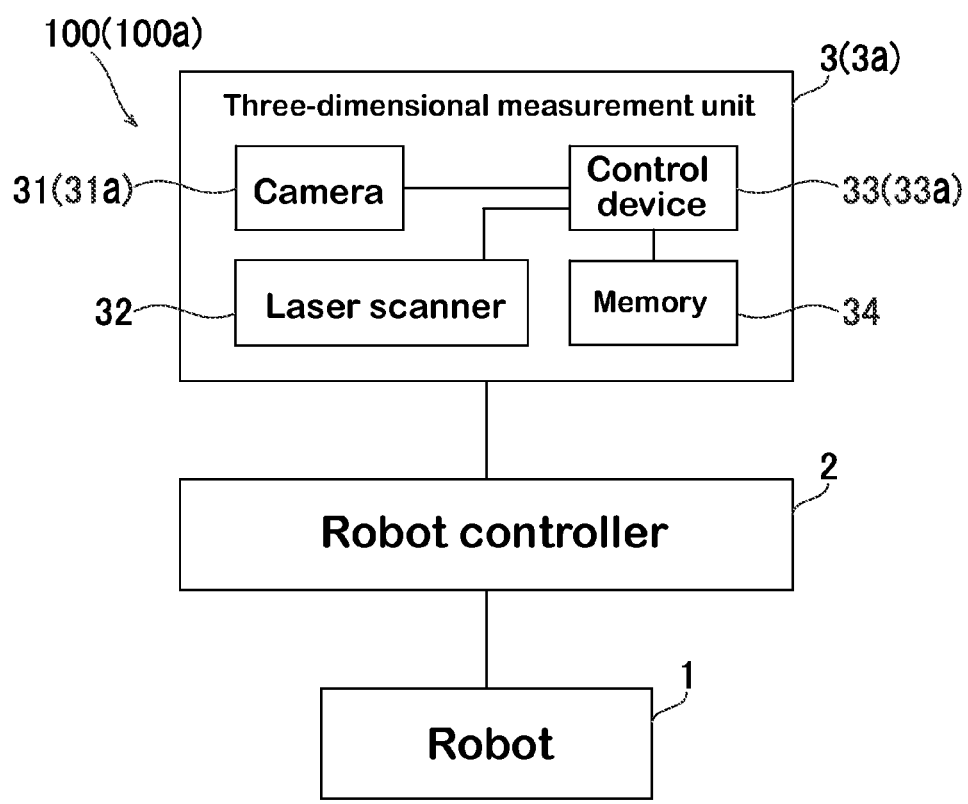

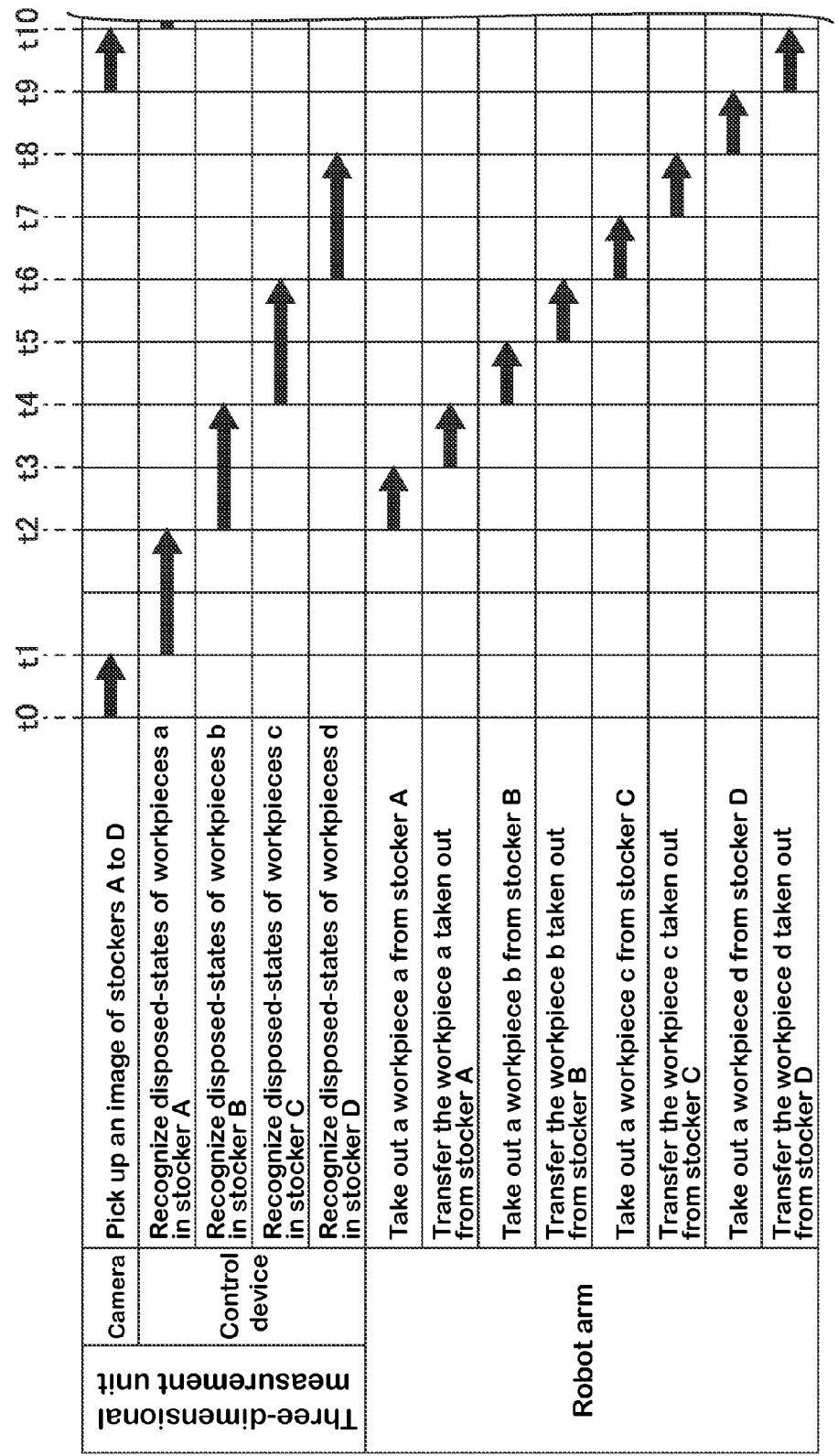
FIG. 5  First embodiment

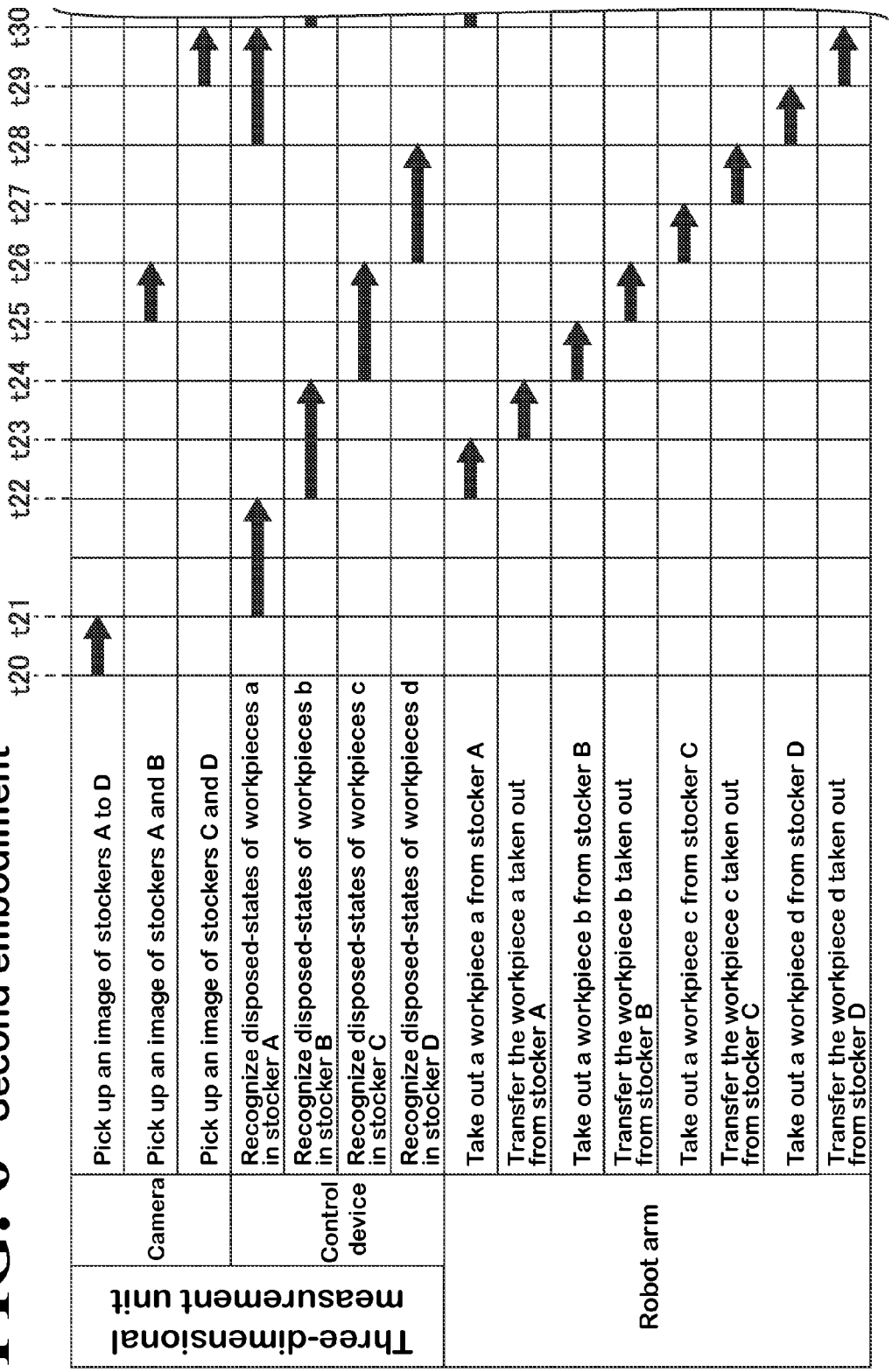
FIG. 6 Second embodiment

Modification

WORKPIECE TAKEOUT SYSTEM, ROBOT APPARATUS, AND METHOD FOR PRODUCING A TO-BE-PROCESSED MATERIAL

CROSS-REFERENCE TO RELATED APPLICATIONS

The present application claims priority under 35 U.S.C. §119 to Japanese Patent Application No. 2011-225434, filed Oct. 13, 2011. The contents of this application are incorporated herein by reference in their entirety.

BACKGROUND OF THE INVENTION

1. Field of the Invention

The present invention relates to a workpiece takeout system, a robot apparatus, and a method for producing a to-be-processed material.

2. Discussion of the Background

In workpiece takeout systems, robot arms are used to take out workpieces (see, for example, Japanese Unexamined Patent Application Publication No. 2011-115930).

Japanese Unexamined Patent Application Publication No. 2011-115930 discloses a workpiece takeout system in which a robot arm takes out a plurality of workpieces disposed in a stocker. The workpiece takeout system includes a sensor unit (disposed-state detector) to pick up an image of an area (in the stocker) in which a plurality of workpieces are disposed, thereby detecting disposed states (such as position and posture) of the plurality of workpieces disposed in the stocker. The robot arm is driven to take out one workpiece selected from the plurality of workpieces based on information of the disposed states detected by the sensor unit.

Some of the conventional workpiece takeout systems, including the one recited in Japanese Unexamined Patent Application Publication No. 2011-115930, accommodate to using a plurality of stockers from which to take out workpieces sequentially. Presumably, this is implemented such that every time one workpiece is taken out from a different stocker among the plurality of stockers, the robot arm is deactivated in order for a three-dimensional measurement unit to detect disposed states of workpieces disposed in another stocker targeted for the next workpiece takeout operation.

SUMMARY OF THE INVENTION

According to one aspect of the present invention, a workpiece takeout system includes a robot arm and a disposed-state detector. The robot arm is configured to perform a workpiece takeout operation to take out a workpiece disposed in an area among a plurality of areas. The disposed-state detector is configured to detect a disposed state of the workpiece and is configured to, while the robot arm is performing the workpiece takeout operation to take out the workpiece disposed in the area among the plurality of areas, detect a disposed state of another workpiece disposed in another area among the plurality of areas.

According to another aspect of the present invention, a robot apparatus includes a robot arm and a disposed-state detector. The robot arm is configured to perform a workpiece takeout operation to take out a workpiece disposed in an area among a plurality of areas. The disposed-state detector is configured to detect a disposed state of the workpiece and is configured to, while the robot arm is performing the workpiece takeout operation to take out the workpiece disposed in the area among the plurality of areas, detect a disposed state of another workpiece disposed in another area among the plurality of areas.

According to the other aspect of the present invention, a method for producing a to-be-processed material includes taking out a to-be-processed material from an area among a plurality of areas using a robot arm. Simultaneously with the taking out step, a disposed state of another to-be-processed material disposed in another area among the plurality of areas is detected using a disposed-state detector. The to-be-processed material taken out by the robot arm is subjected to predetermined processing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a front view of a three-dimensional measurement unit of the robot system according to the first and second embodiments of the present invention;

FIG. 4 is a block diagram of the robot system according to the first and second embodiments of the present invention;

FIG. 5 is a timing chart illustrating operations of the three-dimensional measurement unit and a robot arm associated with the robot system according to the first embodiment of the present invention sequentially taking out workpieces from stockers and transferring the workpieces;

FIG. 6 is a timing chart illustrating operations of the three-dimensional measurement unit and the robot arm associated with the robot system according to the second embodiment of the present invention sequentially taking out workpieces from stockers and transferring the workpieces.

DESCRIPTION OF THE EMBODIMENTS

Figure 1:
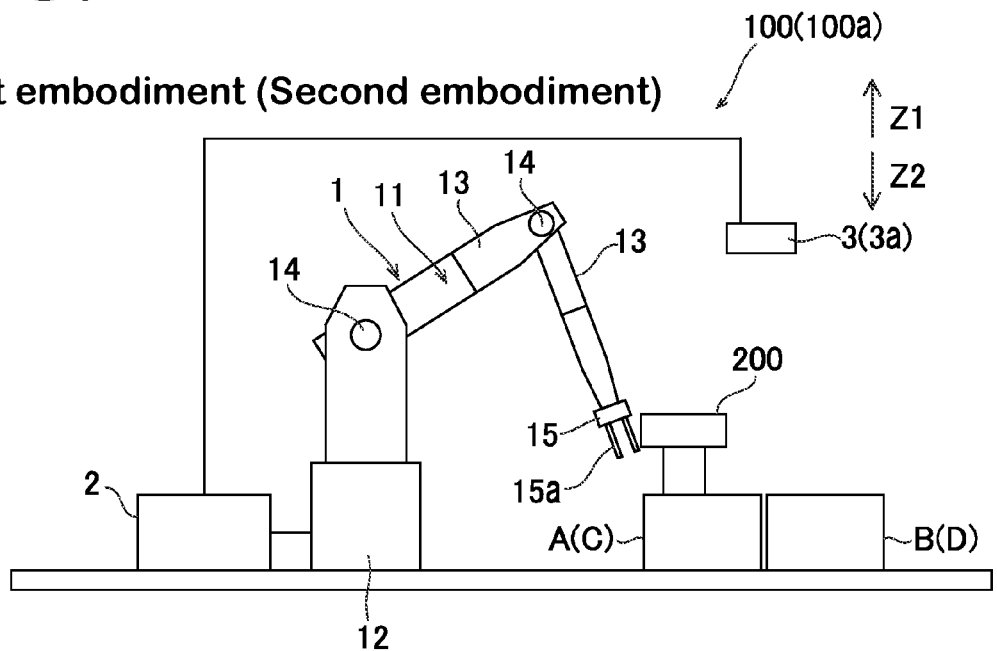
FIG. 1 is a side view of a robot system according to a first embodiment and a second embodiment of the present invention.

The embodiments will now be described with reference to the accompanying drawings, wherein like reference numerals designate corresponding or identical elements throughout the various drawings.

First Embodiment

First, referring to FIGS. 1 to 4, a robot system 100 according to the first embodiment will be described. The robot system 100 corresponds to the "workpiece takeout system" and the "robot apparatus" recited in the accompanying claims.

Figure 2:
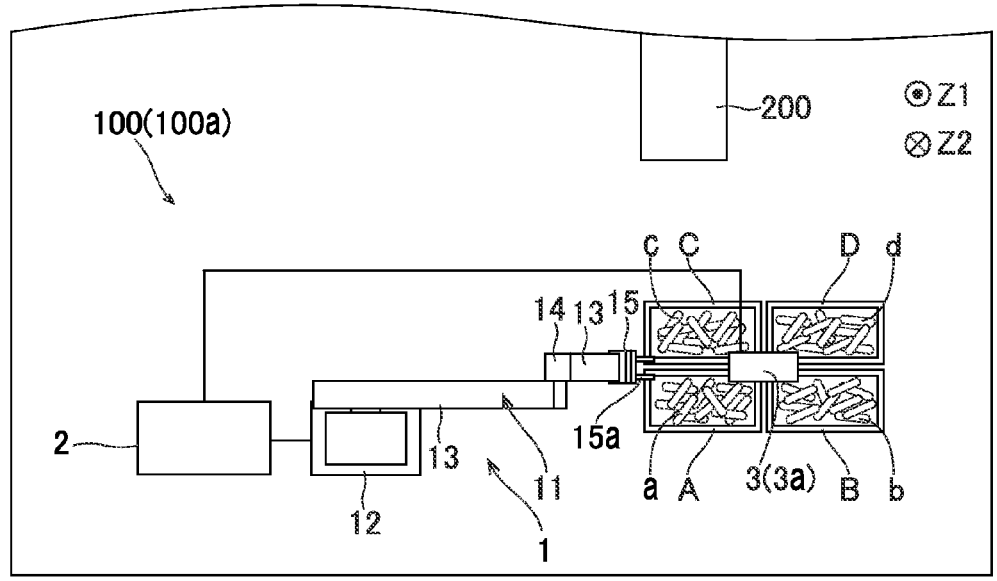
FIG. 2 is a plan view of the robot system according to the first and second embodiments of the present invention.

As shown in FIGS. 1 and 2, the robot system 100 according to the first embodiment includes a robot 1, a robot controller 2, and a three-dimensional measurement unit 3. The robot controller 2 controls the elements of the robot 1. The three-dimensional measurement unit 3 is coupled to the robot controller 2. The robot controller 2 corresponds to the "robot controller" recited in the accompanying claims. The three-dimensional measurement unit 3 corresponds to the "disposed-state detector" recited in the accompanying claims.

Adjacent the robot system 100, four box-shaped stockers A, B, C, and D are disposed. The stockers A to D each have a rectangular opening on their respective upper surfaces (surfaces on the arrow Z1 direction side). The stockers A to D are each made of metal, resin, or other material. As shown in FIG. 2, the stockers A to D respectively accommodate a plurality of workpieces a, b, c, and d disposed in a random manner (in bulk). Adjacent the robot system 100, a machine 200 in charge of the next process (for example, a processor) is disposed. The machine 200 in charge of the next process subjects the workpieces a to d respectively disposed in the stockers A to D to predetermined processing. The stockers A to D each correspond to the "container" recited in the accompanying claims. The workpieces a to d each correspond to the "to-be-processed material" recited in the accompanying claims.

The robot 1 is a multi-articular robot including a robot arm 11. The robot arm 11 includes a base 12, a plurality of arm parts 13, and a plurality of joints 14 coupling the arm parts 13 to each other. The robot arm 11 includes therein a servo motor (not shown) to drive the joints 14. Driving of the robot arm 11 (servo motor) is controlled by the robot controller 2.

At a distal end of the robot arm 11, a hand (gripper) 15 is disposed to grip (hold) the workpieces a to d. The hand 15 includes a pair of fingers 15a. The pair of fingers 15a are driven by an actuator (not shown) to diminish and enlarge the distance between the pair of fingers 15a. The pair of fingers 15a are controlled by the robot controller 2.

In the first embodiment, the robot arm 11 performs a workpiece takeout operation and a workpiece transfer operation. In the workpiece takeout operation, the robot arm 11 takes out one workpiece among the workpieces a, the workpieces b, the workpieces c, or the workpieces d from a corresponding stocker among the four stockers A to D. In the workpiece transfer operation, the robot arm 11 transfers the taken one workpiece a, b, c, or d to a predetermined position on a workpiece table (not shown) of the machine 200 in charge of the next process. In the following description, the robot arm 11 will be illustrated as performing a plurality of cycles of workpiece takeout operations to sequentially take out the workpieces a to d respectively from the stockers A to D. The order of each cycle is: the stocker A, the stocker B, the stocker C, and the stocker D. Each cycle may proceed in any other desired order.

The three-dimensional measurement unit 3 detects disposed states (such as position and posture) of the plurality of respective workpieces a to d respectively disposed in the four stockers A to D (see FIG. 2). As shown in FIG. 1, the three-dimensional measurement unit 3 is disposed at a fixed position above (on the arrow Z1 direction side of) the stockers A to D. As shown in FIGS. 3 and 4, the three-dimensional measurement unit 3 includes a camera 31, a laser scanner 32, a control device 33, and a memory 34. The camera 31 corresponds to the "imaging device" recited in the accompanying claims. The control device 33 corresponds to the "image recognition device" recited in the accompanying claims.

The three-dimensional measurement unit 3 has the camera 31 and the laser scanner 32 oriented downward (in the arrow Z2 direction) to face the upper surfaces of the stockers A to D (on the arrow Z1 direction side) in the manner shown in FIGS. 1 and 2. This ensures that the camera 31 picks up an image of the stockers A to D from above (on the arrow Z1 direction side of) the stockers A to D. In the first embodiment, the camera 31 has a field of view that enables the camera 31 to collectively pick up an image of all the stockers A to D. The laser scanner 32 includes a laser light source (not shown), a mirror (not shown), and a motor (not shown). The laser light source generates slit light. The motor drives the mirror. The laser light source irradiates the mirror with slit laser light while the mirror is rotated by the motor, thereby irradiating (scanning) the workpieces a to d respectively disposed in the stockers A to D with slit laser light. The laser light radiated to the workpieces a to d is reflected to become reflected light, which is imaged by the camera 31 at a predetermined frame rate. The control device 33 recognizes the image picked up by the camera 31. In this image recognition processing, the control device 33 detects the distance between the three-dimensional measurement unit 3 and each of the workpieces a to d respectively disposed in the stockers A to D (three-dimensional shape information of the workpieces a to d) using a principle of triangulation based on the rotational angle of the motor, the position of the image pick-up device of the camera 31, and a positional relationship among the laser light source, the mirror, and the camera.

Based on the distance between the three-dimensional measurement unit 3 and each of the workpieces a to d detected in the image recognition processing, the control device 33 detects disposed states of the plurality of respective workpieces a to d respectively disposed in the stockers A to D. Specifically, the memory 34 of the three-dimensional measurement unit 3 stores in advance three-dimensional shape information of the workpieces a to d. The control device 33 compares the three-dimensional shape information of the workpieces a to d stored in advance in the memory 34 with the detected three-dimensional shape information of the workpieces a to d respectively disposed in the stockers A to D. In this manner, the control device 33 detects disposed states (such as position and posture) of the individual workpieces a to d. In the first embodiment, based on the disposed state information of the workpieces a to d (three-dimensional shape information of the workpieces a to d respectively disposed in the stockers A to D) detected by the three-dimensional measurement unit 3, the robot controller 2 selects one workpiece from the plurality of workpieces a to d respectively disposed in the stockers A to D (for example, a workpiece a, b, c, or d disposed at an easy-to-hold position), and controls the robot arm 11 to take out the selected workpiece a, b, c, or d.

In the first embodiment, while the robot arm 11 is performing its workpiece takeout operation to take out a workpiece a, b, c, or d disposed in a corresponding stocker among the stockers A to D, the three-dimensional measurement unit 3 detects disposed states of the respective workpieces a, the workpieces b, the workpieces c, or the workpieces d respectively disposed in the stocker A, the stocker B, the stocker C, or the stocker D that is different from the current target of the workpiece takeout operation of the robot arm 11. Specifically, while the robot arm 11 is performing its workpiece takeout operation to take out one of the workpiece a, the workpiece b, the workpiece c, and the workpiece d respectively from the stocker A, the stocker B, the stocker C, and the stocker D, the three-dimensional measurement unit 3 detects disposed states of the workpieces a, the workpieces b, the workpieces c, or the workpieces d respectively disposed in the stocker A, the stocker B, the stocker C, or the stocker D that is to be the next target of the workpiece takeout operation of the robot arm 11.

More specifically, in the first embodiment, while the robot arm 11 is performing its workpiece takeout operation to take out the workpiece a from the stocker A, the three-dimensional measurement unit 3 detects disposed states of the respective workpieces b disposed in the stocker B. While the robot arm 11 is performing its workpiece takeout operation to take out the workpiece b from the stocker B, the three-dimensional measurement unit 3 detects disposed states of the respective workpieces c disposed in the stocker C. While the robot arm 11 is performing its workpiece takeout operation to take out the workpiece c from the stocker C, the three-dimensional measurement unit 3 detects disposed states of the respective workpieces d disposed in the stocker D.

When the order of the workpiece takeout operations of the robot arm 11 is: the stocker A, the stocker B, the stocker C, and the stocker D as in the first embodiment, then the three-dimensional measurement unit 3 has the camera 31 collectively pick up an image of all the workpieces a to d before the robot arm 11 sequentially performs its workpiece takeout operations. When the robot arm 11 performs a plurality of cycles of workpiece takeout operations sequentially with respect to the stocker A, the stocker B, the stocker C, and the stocker D in this order as in the first embodiment, then the three-dimensional measurement unit 3 has the camera 31 collectively pick up an image of all the workpieces a to d before every one cycle among the plurality of cycles of workpiece takeout operations. During the workpiece takeout operation to take out one workpiece from the workpieces a, the workpieces b, the workpieces c, or the workpieces d, the three-dimensional measurement unit 3 controls the imaging operation of the camera 31 not to image the target stocker, among the stockers A to D, of the workpiece takeout operation. This eliminates or minimizes the possibility of the robot arm 11 coming into the field of view of the camera 31 in imaging operation.

Next, referring to FIG. 5, description will be made with regard to operations of the three-dimensional measurement unit 3 (the camera 31 and the control device 33) and the robot arm 11 associated with the robot system 100 according to the first embodiment sequentially taking out the workpieces a to d respectively from the stockers A to D and transferring the workpieces a to d.

First, at timing t0 shown in FIG. 5, the camera 31 of the three-dimensional measurement unit 3 starts an imaging operation to collectively pick up an image of all the stockers A to D. The camera 31's imaging operation with respect to the stockers A to D ends at timing t1.

Next, at timing t1, the control device 33 of the three-dimensional measurement unit 3 starts disposed-state recognition processing to recognize disposed states of the workpieces a disposed in the stocker A. Specifically, given the collective image of the stockers A to D picked up in the camera 31's imaging operation with respect to the stockers A to D, the control device 33 starts its image recognition processing to recognize a part of the image corresponding to the stocker A. (That is, the control device 33 detects the distance between the three-dimensional measurement unit 3 and each of the workpieces a disposed in the stocker A.) The control device 33's image recognition processing to recognize the stocker A ends at timing t2. In this manner, the control device 33 at timing t2 detects the distance between the three-dimensional measurement unit 3 and each of the workpieces a disposed in the stocker A (three-dimensional shape information of the workpieces a disposed in the stocker A). Thus, the control device 33 detects disposed states (such as position and posture) of the respective workpieces a disposed in the stocker A. The control device 33 then transmits information of the takeout target workpieces a, such as their position and posture, to the robot controller 2.

Next, at timing t2, the robot arm 11 starts its workpiece takeout operation to take out a workpiece a from the stocker A, which has undergone the disposed-state recognition processing of the control device 33. In this respect, based on the information of the disposed states of the respective workpieces a detected in the disposed-state recognition processing with respect to the stocker A by the control device 33, the robot controller 2 selects a workpiece a (for example, a workpiece a disposed at an easy-to-hold position). In the workpiece takeout operation to take out the selected workpiece a, the robot controller 2 controls the robot arm 11 to take out the selected workpiece a. The robot arm 11's workpiece takeout operation to take out the workpiece a ends at timing t3.

Next, at timing t3, the robot arm 11 starts its workpiece transfer operation to transfer the workpiece a taken out from the stocker A in the workpiece takeout operation to a predetermined position on the workpiece table of the machine 200 in charge of the next process. The robot arm 11's workpiece transfer operation to transfer the workpiece a ends at timing t4.

At timing t2, which is a start timing of the robot arm 11's workpiece takeout operation to take out the stocker A, the control device 33 starts its disposed-state recognition processing to recognize disposed states of the respective workpieces b disposed in the stocker B. Specifically, given the collective image of the stockers A to D picked up in the camera 31's imaging operation (see timings t0 to t1) with respect to the stockers A to D, the control device 33 starts its image recognition processing to recognize a part of the image corresponding to the stocker B. (That is, the control device 33 detects the distance between the three-dimensional measurement unit 3 and each of the workpieces b disposed in the stocker B.) The control device 33's image recognition processing to recognize the stocker B is performed simultaneously with the robot arm 11's workpiece takeout operation and workpiece transfer operation with respect to the workpiece a. The control device 33's image recognition processing to recognize the stocker B ends at timing t4, which is an end timing of the robot arm 11's workpiece transfer operation to transfer the workpiece a. In this manner, the control device 33 at timing t4 detects the distance between the three-dimensional measurement unit 3 and each of the workpieces b disposed in the stocker B (three-dimensional shape information of the workpieces b disposed in the stocker B). Thus, the control device 33 detects disposed states (such as position and posture) of the respective workpieces b disposed in the stocker B. The control device 33 then transmits information of the takeout target workpieces b, such as their position and posture, to the robot controller 2.

Next, at timing t4, the robot arm 11 starts its workpiece takeout operation to take out a workpiece b from the stocker B, which has undergone the disposed-state recognition processing of the control device 33. In this respect, based on the information of the disposed states of the respective workpieces b detected in the disposed-state recognition processing with respect to the stocker B by the control device 33, the robot controller 2 selects a workpiece b (for example, a workpiece b disposed at an easy-to-hold position). In the workpiece takeout operation to take out the selected workpiece b, the robot controller 2 controls the robot arm 11 to take out the selected workpiece b. The robot arm 11's workpiece takeout operation to take out the workpiece b ends at timing t5.

Next, at timing t5, the robot arm 11 starts its workpiece transfer operation to transfer the workpiece b taken out from the stocker B in the workpiece takeout operation to a predetermined position on the workpiece table of the machine 200 in charge of the next process. The robot arm 11's workpiece transfer operation to transfer the workpiece b ends at timing t6.

At timing t4, which is a start timing of the robot arm 11's workpiece takeout operation to take out the workpiece b, the control device 33 starts its disposed-state recognition processing to recognize disposed states of the respective workpieces c disposed in the stocker C. Specifically, given the collective image of the stockers A to D picked up in the camera 31's imaging operation (see timings t0 to t1) with respect to the stockers A to D, the control device 33 starts its image recognition processing to recognize a part of the image corresponding to the stocker C. (That is, the control device 33 detects the distance between the three-dimensional measurement unit 3 and each of the workpieces c disposed in the stocker C.) The control device 33's image recognition processing to recognize the stocker C is performed simultaneously with the robot arm 11's workpiece takeout operation and workpiece transfer operation with respect to the workpiece b. The control device 33's image recognition processing to recognize the stocker C ends at timing t6, which is an end timing of the robot arm 11's workpiece transfer operation to transfer the workpiece b. In this manner, the control device 33 at timing t6 detects the distance between the three-dimensional measurement unit 3 and each of the workpieces c disposed in the stocker C (three-dimensional shape information of the workpieces c disposed in the stocker C). Thus, the control device 33 detects disposed states (such as position and posture) of the respective workpieces c disposed in the stocker C. The control device 33 then transmits information of the takeout target workpieces c, such as their position and posture, to the robot controller 2.

Next, at timing t6, the robot arm 11 starts its workpiece takeout operation to take out a workpiece c from the stocker C, which has undergone the disposed-state recognition processing of the control device 33. In this respect, based on the information of the disposed states of the respective workpieces c detected in the disposed-state recognition processing with respect to the stocker C by the control device 33, the robot controller 2 selects a workpiece c (for example, a workpiece c disposed at an easy-to-hold position). In the workpiece takeout operation to take out the selected workpiece c, the robot controller 2 controls the robot arm 11 to take out the selected workpiece c. The robot arm 11's workpiece takeout operation to take out the workpiece c ends at timing t7.

Next, at timing t7, the robot arm 11 starts its workpiece transfer operation to transfer the workpiece c taken out from the stocker C in the workpiece takeout operation to a predetermined position on the workpiece table of the machine 200 in charge of the next process. The robot arm 11's workpiece transfer operation to transfer the workpiece c ends at timing t8.

At timing t6, which is a start timing of the robot arm 11's workpiece takeout operation to take out the workpiece c, the control device 33 starts its disposed-state recognition processing to recognize disposed states of the respective workpieces d disposed in the stocker D. Specifically, given the collective image of the stockers A to D picked up in the camera 31's imaging operation (see timings t0 to t1) with respect to the stockers A to D, the control device 33 starts its image recognition processing to recognize a part of the image corresponding to the stocker D. (That is, the control device 33 detects the distance between the three-dimensional measurement unit 3 and each of the workpieces d disposed in the stocker D.) The control device 33's image recognition processing to recognize the stocker D is performed simultaneously with the robot arm 11's workpiece takeout operation and workpiece transfer operation with respect to the workpiece c. The control device 33's image recognition processing to recognize the stocker D ends at timing t8, which is an end timing of the robot arm 11's workpiece transfer operation to transfer the workpiece c. In this manner, the control device 33 at timing t8 detects the distance between the three-dimensional measurement unit 3 and each of the workpieces d disposed in the stocker D (three-dimensional shape information of the workpieces d disposed in the stocker D). Thus, the control device 33 detects disposed states (such as position and posture) of the respective workpieces d disposed in the stocker D. The control device 33 then transmits information of the takeout target workpieces d, such as their position and posture, to the robot controller 2.

Thus, in the first embodiment, the robot arm 11 performs its workpiece takeout operations and workpiece transfer operations with respect to the workpieces a to c in the period between timings 2 and 8. Simultaneously in this period, the control device 33 performs its disposed-state recognition processings to recognize the stockers B to D.

Next, at timing t8, the robot arm 11 starts its workpiece takeout operation to take out a workpiece d from the stocker D, which has undergone the disposed-state recognition processing of the control device 33. In this respect, based on the information of the disposed states of the respective workpieces d detected in the disposed-state recognition processing with respect to the stocker D by the control device 33, the robot controller 2 selects a workpiece d (for example, a workpiece d disposed at an easy-to-hold position). In the workpiece takeout operation to take out the selected workpiece d, the robot controller 2 controls the robot arm 11 to take out the selected workpiece d. The robot arm 11's workpiece takeout operation to take out the workpiece d ends at timing t9.

Next, at timing t9, the robot arm 11 starts its workpiece transfer operation to transfer the workpiece d taken out from the stocker D in the workpiece takeout operation to a predetermined position on the workpiece table of the machine 200 in charge of the next process. The robot arm 11's workpiece transfer operation to transfer the workpiece d ends at timing t10.

At timing t9, which is a start timing of the robot arm 11's workpiece transfer operation to transfer the workpiece d, the camera 31 performs again its imaging operation to collectively pick up an image of all the stockers A to D. The camera 31's imaging operation with respect to the stockers A to D is performed simultaneously with the robot arm 11's workpiece transfer operation to transfer the workpiece d. The camera 31's imaging operation with respect to the stockers A to D ends at timing t10, which is an end timing of the robot arm 11's workpiece transfer operation to transfer the workpiece d.

At timings equal to or later than timing t10, the operations performed at timings t1 to t10 are repeated with patterns of timing similar to timings t1 to t10. These operations include the camera 31's imaging operation (see timings t9 to t10), the control device 33's disposed-state recognition processings (see timings t1 to t8), and the robot arm 11's workpiece takeout operations and workpiece transfer operations (see timings t2 to t10).

In the first embodiment, while the robot arm 11 is performing its workpiece takeout operation to take out the workpiece a, the workpiece b, or the workpiece c respectively disposed in the stockers A to C, the three-dimensional measurement unit 3 detects disposed states of the workpieces b, the workpieces c, or the workpieces d respectively disposed in the stocker B, the stocker C, or the stocker D that is different from the stocker currently undergoing the workpiece takeout operation, as described above. That is, when the workpieces a to d are taken out sequentially from the stockers A to D as indicated in FIG. 5, the robot arm 11's workpiece takeout operation to take out the workpiece a, the workpiece b, or the workpiece c respectively disposed in the stockers A to C is performed simultaneously with the three-dimensional measurement unit 3's detection (recognition) of disposed states of the workpieces b, the workpieces c, or the workpieces d respectively disposed in the stocker B, the stocker C, or the stocker D that is different from the stocker currently undergoing the workpiece takeout operation. This eliminates or minimizes the need for deactivating the robot arm 11 while the three-dimensional measurement unit 3 is detecting disposed states of the workpieces b, the workpieces c, or the workpieces d. This ensures a shortened period of time (tact time) for a series of steps associated with sequential takeout of the workpieces a to d respectively from the stockers A to D.

Also in the first embodiment, while the robot arm 11 is performing its workpiece takeout operation to take out the workpiece a, the workpiece b, or the workpiece c respectively disposed in the stockers A to C, the three-dimensional measurement unit 3 detects disposed states of the workpieces a, the workpieces b, the workpieces c, or the workpieces d respectively disposed in the stocker A, the stocker B, the stocker C, or the stocker D that is to be the next target of the workpiece takeout operation of the robot arm 11, as described above. That is, after the workpiece takeout operation is performed to take out the workpiece a, the workpiece b, or the workpiece c respectively disposed in the stockers A to C, the next workpiece takeout operation is performed to take out a workpiece b, a workpiece c, or a workpiece d from the next target stocker B, stocker C, or stocker D. By the time of the next workpiece takeout operation, disposed states of the workpieces b, the workpieces c, or the workpieces d respectively disposed in the next target stocker B, stocker C, or stocker D are already detected. This ensures smooth progress of a series of steps associated with sequential takeout of the workpieces a to d respectively from the stockers A to D.

Also in the first embodiment, the three-dimensional measurement unit 3 includes the camera 31 and the control device 33, as described above. The camera 31 picks up an image of the stockers A to D, and the control device 33 recognizes the image picked up by the camera 31. While the robot arm 11 is performing its workpiece takeout operation to take out the workpiece a, the workpiece b, or the workpiece c respectively disposed in the stockers A to C, the control device 33 uses the image picked up by the camera 31 to perform image recognition processing to recognize the stocker B, the stocker C, or the stocker D that is different from the stocker currently undergoing the workpiece takeout operation. In this manner, the three-dimensional measurement unit 3 detects disposed states of the workpieces b, the workpieces c, or the workpieces d respectively disposed in the stocker B, the stocker C, or the stocker D that is different from the stocker currently undergoing the workpiece takeout operation. This facilitates the simultaneous progress of the robot arm 11's workpiece takeout operation and the three-dimensional measurement unit 3's disposed state detection when the workpieces a to d are taken out sequentially from the stockers A to D. Specifically, the robot arm 11's workpiece takeout operation to take out the workpiece a, the workpiece b, or the workpiece c respectively disposed in the stockers A to C is performed simultaneously with the three-dimensional measurement unit 3's detection of disposed states of the workpieces b, the workpieces c, or the workpieces d respectively disposed in the stocker B, the stocker C, or the stocker D that is different from the stocker currently undergoing the workpiece takeout operation.

Also in the first embodiment, before the robot arm 11 performs its workpiece takeout operations to sequentially take out the stockers A to D, the three-dimensional measurement unit 3 has the camera 31 collectively pick up an image of all the stockers A to D, as described above. When the workpieces a to d are taken out sequentially from the stockers A to D, the camera 31 does not need to pick up an image of the stocker A, the stocker B, the stocker C, or the stocker D that is targeted for the next workpiece takeout operation of the robot arm 11 and is different from the stocker currently undergoing the workpiece takeout operation, every time the robot arm 11 performs its workpiece takeout operation to take out the workpiece a, the workpiece b, the workpiece c, or the workpiece d respectively disposed in the stockers A to D. This ensures a further shortened period of time for a series of steps associated with sequential takeout of the workpieces a to d respectively from the stockers A to D.

Also in the first embodiment, the robot arm 11 performs a plurality of cycles of workpiece takeout operations sequentially with respect to the stockers A to D, and the three-dimensional measurement unit 3 has the camera 31 collectively pick up an image of all the stockers A to D before every one cycle among the plurality of cycles of workpiece takeout operations, as described above. Considering that the disposed states of the respective workpieces a to d can vary in every cycle of workpiece takeout operations by the robot arm 11, the three-dimensional measurement unit 3 detects the disposed states of the respective workpieces a to d before every one cycle among the plurality of cycles of workpiece takeout operations.

Also in the first embodiment, the camera 31's second and later imaging operations (see, for example, timings t9 to t10 shown in FIG. 5) are performed simultaneously with the robot arm 11's workpiece transfer operation to transfer the workpiece d taken out in the last workpiece takeout operation (see timings t9 to t10 shown in FIG. 5) to a predetermined position on the workpiece table of the machine 200 in charge of the next process, as described above. After the robot arm 11 ends its workpiece transfer operation to transfer the workpiece d, and by the time the three-dimensional measurement unit 3 detects (recognizes) disposed states of the workpieces a disposed in the stocker A targeted for the next workpiece takeout operation of the robot arm 11, an image of the workpieces a disposed in the stocker A is already picked up by the camera 31. This ensures smooth repetition of a series of steps associated with sequential takeout of the workpieces a to d respectively from the stockers A to D.

Also in the first embodiment, while the robot arm 11 is performing its workpiece takeout operation to take out the workpiece a, the workpiece b, or the workpiece c respectively disposed in the stockers A to C, and additionally, while the robot arm 11 is performing its workpiece transfer operation to transfer the workpiece a, the workpiece b, or the workpiece c taken out in the workpiece takeout operation to a predetermined position, the three-dimensional measurement unit 3 detects disposed states of the workpieces b, the workpieces c, or the workpieces d respectively disposed in the stocker B, the stocker C, or the stocker D that is different from the stocker currently undergoing the workpiece takeout operation, as described above. Considering that the disposed-state recognition processing (detection of the three-dimensional shape information of the workpieces b to d) is comparatively time-consuming, not only the period of time for the workpiece takeout operations to take out the workpieces a to c respectively disposed in the stockers A to C, but also the period of time for the workpiece transfer operations to transfer the workpieces a to c taken out in the workpiece takeout operations are utilized to ensure reliable disposed-state recognition processing.

Also in the first embodiment, the three-dimensional measurement unit 3 is disposed at a fixed position relative to the stockers A to D, as described above. As opposed to the case of the three-dimensional measurement unit 3 being disposed on the robot arm 11 for example, the three-dimensional measurement unit 3 disposed at a fixed position more easily detects disposed states of the workpieces a to d even while the robot arm 11 is transferring the workpieces a to d respectively from the stockers A to D.

Also in the first embodiment, the three-dimensional measurement unit 3 detects the distance between the three-dimensional measurement unit 3 and each of the workpieces a to d so as to detect disposed states of the respective workpieces a to d. Based on information of the disposed states of the respective workpieces a to d detected by the three-dimensional measurement unit 3, the robot controller 2 selects one workpiece from the workpieces a, the workpieces b, the workpieces c, or the workpieces d, and controls the robot arm 11 to take out the selected one workpiece a, b, c, or d, as described above. This ensures selection of a workpiece a, b, c, or d that is easier for the robot arm 11 to take out based on information of the disposed states of the respective workpieces a to d detected by the three-dimensional measurement unit 3.

Second Embodiment

Next, referring to FIGS. 1 to 4 and 6, a robot system 100a according to a second embodiment will be described. In the second embodiment, a three-dimensional measurement unit 3a includes a camera 31a to collectively pick up an image of all the stockers A to D, similarly to the first embodiment. In addition, the camera 31a is able to pick up an image of only the stockers A and B (or the stockers C and D) among the stockers A to D. The robot system 100a corresponds to the "workpiece takeout system" and the "robot apparatus" recited in the accompanying claims. The three-dimensional measurement unit 3a corresponds to the "disposed-state detector" recited in the accompanying claims. The camera 31a corresponds to the "imaging device" recited in the accompanying claims.

As shown in FIGS. 1 and 2, the camera 31a of the three-dimensional measurement unit 3a according to the second embodiment (see FIGS. 3 and 4) is oriented downward (in the arrow Z2 direction) to face the upper surfaces of the stockers A to D (on the arrow Z1 direction side). This ensures that the camera 31a picks up an image of the stockers A to D from above (on the arrow Z1 direction side of) the stockers A to D.

In the second embodiment, the camera 31a is able to pick up an image of only the stockers A and B (or the stockers C and D) among the stockers A to D. The camera 31a is also able to collectively pick up an image of all the stockers A to D.

In the second embodiment, the control device 33a of the three-dimensional measurement unit 3a (see FIGS. 3 and 4) recognizes an image of the stockers A and B (or the stockers C and D) picked up by the camera 31a so as to detect the distance between the three-dimensional measurement unit 3a and each of the workpieces a and b respectively disposed in the stockers A and B (or the distance between the three-dimensional measurement unit 3a and each of the workpieces c and d respectively disposed in the stockers C and D). Based on the distance between the three-dimensional measurement unit 3a and each of the workpieces a to d detected in the image recognition processing, the control device 33a detects disposed states of the workpieces a to d respectively disposed in the stockers A to D.

The second embodiment is otherwise similar to the first embodiment.

Next, referring to FIG. 6, description will be made with regard to operations of the three-dimensional measurement unit 3a (the camera 31a and the control device 33a) and the robot arm 11 associated with the robot system 100a according to the second embodiment sequentially taking out the workpieces a to d respectively from the stockers A to D and transferring the workpieces a to d. In the second embodiment, similarly to the first embodiment, the robot arm 11 will be illustrated as performing a plurality of cycles of workpiece takeout operations to sequentially take out the workpieces a to d respectively from the stockers A to D. The order of the plurality of cycles of workpiece takeout operations is: the stocker A, the stocker B, the stocker C, and the stocker D.

First, at timing t20 shown in FIG. 6, the camera 31a of the three-dimensional measurement unit 3a starts its imaging operation to collectively pick up an image of all the stockers A to D. The camera 31a's imaging operation with respect to the stockers A to D ends at timing t21.

Next, at timing t21, the control device 33a of the three-dimensional measurement unit 3a starts its disposed-state recognition processing to recognize disposed states of the workpieces a disposed in the stocker A. Specifically, given the collective image of the stockers A to D picked up in the camera 31a's imaging operation with respect to the stockers A to D, the control device 33a starts its image recognition processing to recognize a part of the image corresponding to the stocker A. (That is, the control device 33a detects the distance between the three-dimensional measurement unit 3a and each of the workpieces a disposed in the stocker A.) The control device 33a's image recognition processing to recognize the stocker A ends at timing t22. In this manner, the control device 33a at timing t22 detects the distance between the three-dimensional measurement unit 3a and each of the workpieces a disposed in the stocker A (three-dimensional shape information of the workpieces a disposed in the stocker A). Thus, the control device 33a detects disposed states of the workpieces a disposed in the stocker A.

Next, at timing t22, the robot arm 11 starts its workpiece takeout operation to take out a workpiece a from the stocker A, which has undergone the disposed-state recognition processing of the control device 33a. In this respect, based on information of the disposed states of the respective workpieces a detected in the disposed-state recognition processing with respect to the stocker A by the control device 33a, the robot controller 2 selects a workpiece a (for example, a workpiece a disposed at an easy-to-hold position). In the workpiece takeout operation to take out the selected workpiece a, the robot controller 2 controls the robot arm 11 to take out the selected workpiece a. The robot arm 11's workpiece takeout operation to take out the workpiece a ends at timing t23.

Next, at timing t23, the robot arm 11 starts its workpiece transfer operation to transfer the workpiece a taken out from the stocker A in the workpiece takeout operation to a predetermined position on the workpiece table of the machine 200 in charge of the next process. The robot arm 11's workpiece transfer operation to transfer the workpiece a ends at timing t24.

At timing t22, which is a start timing of the robot arm 11's workpiece takeout operation to take out the workpiece a, the control device 33a starts its disposed-state recognition processing to recognize disposed states of the respective workpieces b disposed in the stocker B. Specifically, given the collective image of the stockers A to D picked up in the camera 31a's imaging operation (see timings t20 to t21) with respect to the stockers A to D, the control device 33a starts its image recognition processing to recognize a part of the image corresponding to the stocker B. (That is, the control device 33a detects the distance between the three-dimensional measurement unit 3a and each of the workpieces b disposed in the stocker B.) The control device 33a's image recognition processing to recognize the stocker B is performed simultaneously with the robot arm 11's workpiece takeout operation and workpiece transfer operation with respect to the workpiece a. The control device 33a's image recognition processing to recognize the stocker B ends at timing t24, which is an end timing of the robot arm 11's workpiece transfer operation to transfer the workpiece a. In this manner, the control device 33a at timing t24 detects the distance between the three-dimensional measurement unit 3a and each of the workpieces b disposed in the stocker B (three-dimensional shape information of the workpieces b disposed in the stocker B). Thus, the control device 33a detects disposed states (such as position and posture) of the respective workpieces b disposed in the stocker B.

Next, at timing t24, the robot arm 11 starts its workpiece takeout operation to take out a workpiece b from the stocker B, which has undergone the disposed-state recognition processing of the control device 33a. In this respect, based on information of the disposed states of the respective workpieces b detected in the disposed-state recognition processing with respect to the stocker B by the control device 33a, the robot controller 2 selects a workpiece b (for example, a workpiece b disposed at an easy-to-hold position). In the workpiece takeout operation to take out the selected workpiece b, the robot controller 2 controls the robot arm 11 to take out the selected workpiece b. The robot arm 11's workpiece takeout operation to take out the workpiece b ends at timing t25.

Next, at timing t25, the robot arm 11 starts its workpiece transfer operation to transfer the workpiece b taken out from the stocker B in the workpiece takeout operation to a predetermined position on the workpiece table of the machine 200 in charge of the next process. The robot arm 11's workpiece transfer operation to transfer the workpiece b ends at timing t26.

At timing t24, which is a start timing of the robot arm 11's workpiece takeout operation to take out the workpiece b, the control device 33a starts its disposed-state recognition processing to recognize disposed states of the respective workpieces c disposed in the stocker C. Specifically, given the collective image of the stockers A to D picked up in the camera 31a's imaging operation (see timings t20 to t21) with respect to the stockers A to D, the control device 33a starts its image recognition processing to recognize a part of the image corresponding to the stocker C. (That is, the control device 33a detects the distance between the three-dimensional measurement unit 3a and each of the workpieces c disposed in the stocker C.) The control device 33a's image recognition processing to recognize the stocker C is performed simultaneously with the robot arm 11's workpiece takeout operation and workpiece transfer operation with respect to the workpiece b. The control device 33a's image recognition processing to recognize the stocker C ends at timing t26, which is an end timing of the robot arm 11's workpiece transfer operation to transfer the workpiece b. In this manner, the control device 33a at timing t26 detects the distance between the three-dimensional measurement unit 3a and each of the workpieces c disposed in the stocker C (three-dimensional shape information of the workpieces c disposed in the stocker C). Thus, the control device 33a detects disposed states (such as position and posture) of the respective workpieces c disposed in the stocker C.

At timing t25, which is a start timing of the robot arm 11's workpiece transfer operation to transfer the workpiece b, the camera 31a starts its imaging operation to simultaneously pick up an image of only the stockers A and B among the stockers A to D. The camera 31a's imaging operation with respect to the stockers A and B is performed simultaneously with the robot arm 11's workpiece transfer operation to transfer the workpiece b. The camera 31a's imaging operation with respect to the stockers A and B ends at timing t26, which is an end timing of the robot arm 11's workpiece transfer operation to transfer the workpiece b.

Next, at timing t26, the robot arm 11 starts its workpiece takeout operation to take out a workpiece c from the stocker C, which has undergone the disposed-state recognition processing of the control device 33a. In this respect, based on information of the disposed states of the respective workpieces c detected in the disposed-state recognition processing with respect to the stocker C by the control device 33a, the robot controller 2 selects a workpiece c (for example, a workpiece c disposed at an easy-to-hold position). In the workpiece takeout operation to take out the selected workpiece c, the robot controller 2 controls the robot arm 11 to take out the selected workpiece c. The robot arm 11's workpiece takeout operation to take out the workpiece c ends at timing t27.

Next, at timing t27, the robot arm 11 starts its workpiece transfer operation to transfer the workpiece c taken out from the stocker C in the workpiece takeout operation to a predetermined position on the workpiece table of the machine 200 in charge of the next process. The robot arm 11's workpiece transfer operation to transfer the workpiece c ends at timing t28.

At timing t26, which is a start timing of the robot arm 11's workpiece takeout operation to take out the workpiece c, the control device 33a starts its disposed-state recognition processing to recognize disposed states of the respective workpieces d disposed in the stocker D. Specifically, given the collective image of the stockers A to D picked up in the camera 31a's imaging operation (see timings t20 to t21) with respect to the stockers A to D, the control device 33a starts its image recognition processing to recognize a part of the image corresponding to the stocker D. (That is, the control device 33a detects the distance between the three-dimensional measurement unit 3a and each of the workpieces d disposed in the stocker D.) The control device 33a's image recognition processing to recognize the stocker D is performed simultaneously with the robot arm 11's workpiece takeout operation and workpiece transfer operation with respect to the workpiece c. The control device 33a's image recognition processing to recognize the stocker D ends at timing t28, which is an end timing of the robot arm 11's workpiece transfer operation to transfer the workpiece c. In this manner, the control device 33a at timing t28 detects the distance between the three-dimensional measurement unit 3a and each of the workpieces d disposed in the stocker D (three-dimensional shape information of the workpieces d disposed in the stocker D). Thus, the control device 33a detects disposed states (such as position and posture) of the respective workpieces d disposed in the stocker D.

Next, at timing t28, the robot arm 11 starts its workpiece takeout operation to take out a workpiece d from the stocker D, which has undergone the disposed-state recognition processing of the control device 33a. In this respect, based on information of the disposed states of the respective workpieces d detected in the disposed-state recognition processing with respect to the stocker D by the control device 33a, the robot controller 2 selects a workpiece d (for example, a workpiece d disposed at an easy-to-hold position). In the workpiece takeout operation to take out the selected workpiece d, the robot controller 2 controls the robot arm 11 to take out the selected workpiece d. The robot arm 11's workpiece takeout operation to take out the workpiece d ends at timing t29.

Next, at timing t29, the robot arm 11 starts its workpiece transfer operation to transfer the workpiece d taken out from the stocker D in the workpiece takeout operation to a predetermined position on the workpiece table of the machine 200 in charge of the next process. The robot arm 11's workpiece transfer operation to transfer the workpiece d ends at timing t30.

At timing t28, which is a start timing of the robot arm 11's workpiece takeout operation to take out the workpiece d, the control device 33a starts its disposed-state recognition processing to recognize disposed states of the respective disposed states of the workpieces a disposed in the stocker A. Specifically, given the image of the stockers A and B picked up in the camera 31a's imaging operation with respect to the stockers A and B, the control device 33a starts its image recognition processing to recognize a part of the image corresponding to the stocker A. (That is, the control device 33a detects the distance between the three-dimensional measurement unit 3a and each of the workpieces a disposed in the stocker A.) The control device 33a's image recognition processing to recognize the stocker A is performed simultaneously with the robot arm 11's workpiece takeout operation and workpiece transfer operation with respect to the workpiece d. The control device 33a's image recognition processing to recognize the stocker A ends at timing t30, which is an end timing of the robot arm 11's workpiece transfer operation to transfer the workpiece d. In this manner, the control device 33a at timing t30 detects the distance between the three-dimensional measurement unit 3a and each of the workpieces a disposed in the stocker A (three-dimensional shape information of the workpieces a disposed in the stocker A). Thus, the control device 33a detects disposed states (such as position and posture) of the respective workpieces a disposed in the stocker A.

At timing t29, which is a start timing of the robot arm 11's workpiece transfer operation to transfer the workpiece d, the camera 31a starts its imaging operation to simultaneously pick up an image of only the stockers C and D among the stockers A to D. The camera 31a's imaging operation with respect to the stockers C and D is performed simultaneously with the robot arm 11's workpiece transfer operation to transfer the workpiece d. The camera 31a's imaging operation with respect to the stockers C and D ends at timing t30, which is an end timing of the robot arm 11's workpiece transfer operation to transfer the workpiece d.

At timings equal to or later than timing t30, the operations performed at timings t22 to t30 are repeated with patterns of timing similar to timings t22 to t30. These operations include the camera 31a's imaging operations (see timings t25 to t26 and timings t29 to t30), the control device 33a's disposed-state recognition processings (see timings t22 to t30), and the robot arm 11's workpiece takeout operations and workpiece transfer operations (see timings t22 to t30).

In the second embodiment, before or at timing t25, the robot arm 11 ends its workpiece takeout operation (see, for example, timings t22 to t23 shown in FIG. 6) and workpiece transfer operation with respect to the workpiece a (see timings t23 to t24 shown in FIG. 6), and workpiece takeout operation to take out the workpiece b (see timings t24 to t25 shown in FIG. 6). At this timing t25, the camera 33a starts again its imaging operation (see timings t25 to t26 shown in FIG. 6) with respect to the stockers A and B among the stockers A to D simultaneously with the control device 33a's image recognition processings and the robot arm 11's operations to be performed at equal to or later than timing t25. This ensures that the control device 33a's second and later image recognition processings with respect to the stockers A and B start at timings (see, for example, timing t28 shown in FIG. 6) earlier than corresponding timings in the first embodiment (see, for example, timing t10 shown in FIG. 5). This in turn ensures a further shortened period of tact time for a plurality of cycles of workpiece takeout operations performed by the robot arm 11 in the order: the stocker A, the stocker B, the stocker C, and the stocker D.

Also in the second embodiment, the control device 33a's second and later disposed-state recognition processings with respect to the stocker A (see, for example, timings t28 to t30 shown in FIG. 6) are performed simultaneously with the robot arm 11's workpiece takeout operations (see, for example, timings t28 to t29 shown in FIG. 6) and workpiece transfer operations (see, for example, timings t29 to t30 shown in FIG. 6) with respect to the previous workpiece d. This ensures a further shortened period of tact time for a plurality of cycles of workpiece takeout operations performed by the robot arm 11 in the order: the stocker A, the stocker B, the stocker C, and the stocker D.

The second embodiment provides other advantageous effects similar to those provided by the first embodiment.

In the first and second embodiments, the robot system (or the workpiece takeout system or the robot apparatus) has its robot arm take out workpieces disposed in areas defined by four stockers (containers). This, however, should not be construed in a limiting sense. The workpiece takeout system or the robot apparatus may have its robot arm take out workpieces disposed in two or three areas. The workpiece takeout system or the robot apparatus may also have its robot arm take out workpieces disposed in five or more areas.

In the first and second embodiments, while the robot arm is performing its workpiece takeout operation to take out a workpiece disposed in an area of one stocker among the four stockers (containers), the three-dimensional measurement unit (disposed-state detector) detects disposed states of workpieces disposed in another stocker targeted for the next workpiece takeout operation by the robot arm. This, however, should not be construed in a limiting sense. While the robot arm is performing its workpiece takeout operation to take out a workpiece disposed in one area among a plurality of areas, the disposed-state detector may detect disposed states of other workpieces disposed in another area targeted for a workpiece takeout operation later than the next workpiece takeout operation of the robot arm.

In the first and second embodiments, the three-dimensional measurement unit (disposed-state detector) is disposed at a fixed position relative to the areas defined by the four stockers (containers). This, however, should not be construed in a limiting sense. The disposed-state detector may be movable relative to a plurality of areas.

In the first and second embodiments, the three-dimensional measurement unit (disposed-state detector) detects the distance between the disposed-state detector and a workpiece so as to detect a disposed state of the workpiece. This, however, should not be construed in a limiting sense. The disposed-state detector may detect a disposed state of a workpiece by a method other than detecting the distance between the disposed-state detector and the workpiece. For example, it is possible to pick up a two-dimensional image of the workpiece using a CMOS sensor or a CCD so as to detect a disposed state of the workpiece.

In the first and second embodiments, the robot system (or the workpiece takeout system or the robot apparatus) has its robot arm take out a plurality of workpieces sequentially, that is, one at a time, from the areas defined by the four stockers (containers). This, however, should not be construed in a limiting sense. In a robot system 100b according to a modification shown in FIG. 7, a single stocker E has four imaginary delimited areas E1, E2, E3, and E4 and accommodates a plurality of workpieces e. The robot arm takes out the plurality of workpieces e sequentially, that is, one at a time, from the areas E1 to E4. The stocker E corresponds to the "container" recited in the accompanying claims. The robot system 100b corresponds to the "workpiece takeout system" and the "robot apparatus" recited in the accompanying claims.

Figure 7:
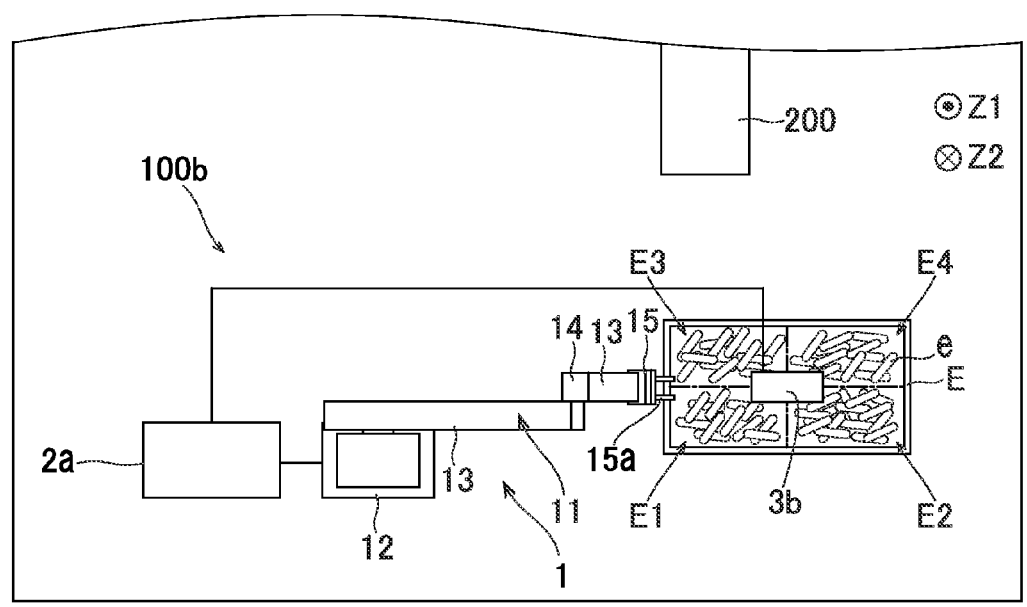
FIG. 7 is a plan view of a robot system according to a modification of the first and second embodiments of the present invention.

In the modification shown in FIG. 7, a three-dimensional measurement unit 3b recognizes the interior of the stocker E as being imaginarily delimited into the four areas E1 to E4. In this manner, the three-dimensional measurement unit 3b detects disposed states of a plurality of workpieces e disposed in each of the four areas E1 to E4. While the robot arm 11 is performing its workpiece takeout operation to take out a workpiece e disposed in one area among the areas E1 to E4, the three-dimensional measurement unit 3b detects disposed states of the respective workpieces e disposed in the areas E1 to E4 excluding the current target of the workpiece takeout operation of the robot arm 11. Based on information of the disposed states of the respective workpieces e disposed in the areas E1 to E4 detected by the three-dimensional measurement unit 3b, a robot controller 2a selects one workpiece e among the plurality of workpieces e disposed in the areas E1 to E4 (for example, a workpiece e disposed at an easy-to-hold position), and controls the robot arm 11 to take out the selected workpiece e. The three-dimensional measurement unit 3b corresponds to the "disposed-state detector" recited in the accompanying claims. The robot controller 2a corresponds to the "robot controller" recited in the accompanying claims.

While in the modification shown in FIG. 7 the interior of the stocker E is imaginarily delimited, the interior of the stocker E may also be physically delimited by partitions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing a to-be-processed material, the method comprising:
    taking out a first to-be-processed material from a first container using a robot arm;
    detecting a disposed state of a second to-be-processed material disposed in a second container using a single disposed-state detector while the robot arm is taking out the first to-be-processed material disposed in the first container and before the robot arm transfers the first to-be-processed material to a predetermined position; and
    subjecting the first to-be-processed material taken out by the robot arm to predetermined processing.

2. A robot apparatus comprising:
    a robot arm configured to perform a first workpiece takeout operation to take out a first workpiece disposed in a first container; and
    a single disposed-state detector configured to detect a first disposed state of the first workpiece and configured to, while the robot arm is taking out the first workpiece disposed in the first container so as to perform the first workpiece takeout operation and before the robot arm transfers the first workpiece to a predetermined position, detect a second state of a second workpiece disposed in a second container.

3. The robot apparatus according to claim 2,
    wherein the disposed-state detector is configured to detect a distance between the disposed-state detector and each of a plurality of workpieces so as to detect disposed states of the plurality of respective workpieces, and
    wherein the robot apparatus further comprises a robot controller configured to select the workpiece from the plurality of workpieces based on information of the disposed states of the plurality of respective workpieces detected by the disposed-state detector, and configured to control the robot arm to take out the selected workpiece.

4. A workpiece takeout system comprising:
    a robot arm configured to perform a first workpiece takeout operation to take out a first workpiece disposed in a first container; and
    a single disposed-state detector configured to detect a first disposed state of the first workpiece and configured to, while the robot arm is taking out the first workpiece disposed in the first container so as to perform the first workpiece takeout operation and before the robot arm transfers the first workpiece to a predetermined position, detect a second disposed state of a second workpiece disposed in a second container.

5. The workpiece takeout system according to claim 4, wherein the second container is a target of a next or later workpiece takeout operation to be performed by the robot arm.

6. The workpiece takeout system according to claim 5,
    wherein the robot arm is configured to perform a workpiece takeout operation to take out a workpiece disposed in a container among a plurality of containers,
    wherein the plurality of containers comprise
        the first container comprising the first workpiece and being a target of the first workpiece takeout operation performed by the robot arm,
        the second container comprising the second workpiece and being a target of a second workpiece takeout operation to be performed next to the first workpiece takeout operation by the robot arm, and
        a third container comprising a third workpiece and being a target of a third workpiece takeout operation to be performed next to the second workpiece takeout operation by the robot arm,
    wherein while the robot arm is taking out the first workpiece disposed in the first container so as to perform the first workpiece takeout operation and before the robot arm transfers the first workpiece to the predetermined position, the disposed-state detector is configured to detect the second disposed state of the second workpiece disposed in the second container, and
    wherein while the robot arm is taking out the second workpiece disposed in the second container so as to perform the second workpiece takeout operation and before the robot arm transfers the second workpiece to a predetermined position, the disposed-state detector is configured to detect a third disposed state of the third workpiece disposed in the third container.

7. The workpiece takeout system according to claim 4,
    wherein the disposed-state detector comprises
        an imaging device configured to pick up an image of at least one of the first container and the second container, and
        an image recognition device configured to recognize the image picked up by the imaging device, and
    wherein while the robot arm is taking out the first workpiece disposed in the first container so as to perform the first workpiece takeout operation and before the robot arm transfers the first workpiece to the predetermined position, the imaging device is configured to pick up an image of the second container, and the image recognition device is configured to recognize the image of the second container other area picked up by the imaging device, so as to detect the second disposed state of second workpiece disposed in the second container.

8. The workpiece takeout system according to claim 7, wherein the robot arm is configured to perform a plurality of workpiece takeout operations sequentially with respect to the first container and the second container, and wherein before the robot arm performs the plurality of workpiece takeout operations sequentially with respect to the first container and the second container, the imaging device of the disposed-state detector is configured to collectively pick up an image of the first container and the second container.

9. The workpiece takeout system according to claim 8, wherein the robot arm is configured to perform a plurality of cycles of workpiece takeout operations sequentially with respect to the first container and the second container, and wherein the imaging device of the disposed-state detector is configured to collectively pick up the image of the first container and the second container before every one cycle among the plurality of cycles of workpiece takeout operations.

10. The workpiece takeout system according to claim 8, wherein the imaging device is configured to pick up the image simultaneously with a workpiece transfer operation of the robot arm to transfer, to a predetermined position, a workpiece taken out by a workpiece takeout operation among the plurality of workpiece takeout operations.

11. The workpiece takeout system according to claim 4, wherein the robot arm is configured to perform a first workpiece transfer operation to transfer, to the predetermined position, the first workpiece taken out in the first workpiece takeout operation of the robot arm, and wherein while the robot arm is taking out the first workpiece disposed in the first container so as to perform the first workpiece takeout operation and while the robot arm is performing the first workpiece transfer operation, the disposed-state detector is configured to detect the second disposed state of the second workpiece disposed in the second container.

12. The workpiece takeout system according to claim 4, wherein the disposed-state detector is disposed at a fixed position relative to the first container and the second container.

13. The workpiece takeout system according to claim 4, further comprising a plurality of containers each comprising a workpiece, wherein the robot arm is configured to perform a workpiece takeout operation to take out a workpiece disposed in a container among the plurality of containers, and wherein while the robot arm is taking out the workpiece disposed in the container so as to perform the workpiece takeout operation and before the robot arm transfers the workpiece to a predetermined position, the disposed-state detector is configured to detect a disposed state of another workpiece disposed in another container among the plurality of containers.

14. The workpiece takeout system according to claim 4, wherein the disposed-state detector is configured to detect a distance between the disposed-state detector and each of a plurality of workpieces so as to detect disposed states of the plurality of respective workpieces, and wherein the robot arm is configured to take out a workpiece selected from the plurality of workpieces based on information of the disposed states of the plurality of respective workpieces detected by the disposed-state detector.

15. The workpiece takeout system according to claim 5, wherein the disposed-state detector comprises
an imaging device configured to pick up an image of at least one of the first container and the second container, and
an image recognition device configured to recognize the image picked up by the imaging device, and
wherein while the robot arm is taking out the first workpiece disposed in the first container so as to perform the first workpiece takeout operation and before the robot arm transfers the first workpiece to the predetermined position, the imaging device is configured to pick up an image of the second container, and the image recognition device is configured to recognize the image of the second container picked up by the imaging device, so as to detect the second disposed state of the second workpiece disposed in the second container.

16. The workpiece takeout system according to claim 6, wherein the disposed-state detector comprises
an imaging device configured to pick up an image of at least one container among the plurality of containers, and
an image recognition device configured to recognize the image picked up by the imaging device, and
wherein while the robot arm is taking out the first workpiece disposed in the first container so as to perform the first workpiece takeout operation and before the robot arm transfers the first workpiece to the predetermined position, the imaging device is configured to pick up an image of the second container, and the image recognition device is configured to recognize the image of the second container picked up by the imaging device, so as to detect the second disposed state of the second workpiece disposed in the second container.

17. The workpiece takeout system according to claim 9, wherein the imaging device is configured to pick up the image simultaneously with a workpiece transfer operation of the robot arm to transfer, to a predetermined position, a workpiece taken out by a workpiece takeout operation among the plurality of workpiece takeout operations.

18. The workpiece takeout system according to claim 5, wherein the robot arm is configured to perform a first workpiece transfer operation to transfer, to the predetermined position, the first workpiece taken out in the first workpiece takeout operation of the robot arm, and wherein while the robot arm is taking out the first workpiece disposed in the first container so as to perform the first workpiece takeout operation and while the robot arm is performing the first workpiece transfer operation, the disposed-state detector is configured to detect the second disposed state of the second workpiece disposed in the second container.

19. The workpiece takeout system according to claim 6, wherein the robot arm is configured to perform a first workpiece transfer operation to transfer, to the predetermined position, the first workpiece taken out in the first workpiece takeout operation of the robot arm, and wherein while the robot arm is taking out the first workpiece disposed in the first container so as to perform the first workpiece takeout operation and while the robot arm is performing the first workpiece transfer operation, the disposed-state detector is configured to detect the second disposed state of the second workpiece disposed in the second container.

20. The workpiece takeout system according to claim 7,
wherein the robot arm is configured to perform a first workpiece transfer operation to transfer, to the predetermined position, the first workpiece taken out in the first workpiece takeout operation of the robot arm, and
wherein while the robot arm is taking out the first workpiece disposed in the first container so as to perform the first workpiece takeout operation and while the robot arm is performing the first workpiece transfer operation, the disposed-state detector is configured to detect the second disposed state of the second workpiece disposed in the second container.

* * * * *